United States Patent
Haynes et al.

(10) Patent No.: US 9,452,827 B2
(45) Date of Patent: Sep. 27, 2016

(54) LANDING GEAR COMPONENTS HAVING IMPROVED JOINTS

(71) Applicant: GOODRICH CORPORATION, Charlotte, NC (US)

(72) Inventors: Noel C. Haynes, Milton (CA); Marilea Manzini, Vaughn (CA)

(73) Assignee: Goodrich Corporation, Charlotte, NC (US)

( * ) Notice: Subject to any disclaimer, the term of this patent is extended or adjusted under 35 U.S.C. 154(b) by 67 days.

(21) Appl. No.: 14/497,662

(22) Filed: Sep. 26, 2014

(65) Prior Publication Data

US 2016/0090172 A1 Mar. 31, 2016

(51) Int. Cl.
*B64C 25/58* (2006.01)
*B64C 25/10* (2006.01)
*C22C 19/07* (2006.01)
*F16F 9/32* (2006.01)
*B64D 45/00* (2006.01)

(52) U.S. Cl.
CPC .............. *B64C 25/58* (2013.01); *B64C 25/10* (2013.01); *C22C 19/07* (2013.01); *F16F 9/3235* (2013.01); *B64D 2045/009* (2013.01)

(58) Field of Classification Search
CPC ..... B64C 25/001; B64C 25/18; B64C 25/20; B64C 25/58; B64C 25/62; B64C 2045/00; F16C 2223/30
See application file for complete search history.

(56) References Cited

U.S. PATENT DOCUMENTS

| 1,759,652 | A | * | 5/1930 | Loening | B64C 35/00 244/101 |
| 3,356,542 | A | | 12/1967 | Smith | |
| 4,359,199 | A | * | 11/1982 | Kramer | B64C 25/34 244/100 R |
| 4,474,651 | A | * | 10/1984 | Yauchi | C25D 5/10 205/122 |
| 2004/0236433 | A1 | | 11/2004 | Kennedy et al. | |
| 2008/0075604 | A1 | * | 3/2008 | Jabado | B23H 3/04 416/241 R |
| 2008/0217107 | A1 | * | 9/2008 | Schmidt | B64C 25/18 184/39 |
| 2008/0272234 | A1 | * | 11/2008 | Thulbon | B64C 25/14 244/102 R |
| 2009/0081068 | A1 | * | 3/2009 | Garrison, Jr. | C21D 6/004 420/38 |

(Continued)

FOREIGN PATENT DOCUMENTS

| EP | 1195446 | 4/2002 |
| WO | 2006071263 | 7/2006 |
| WO | 2014101772 | 7/2014 |

OTHER PUBLICATIONS

Richard B. Frank, et al. "Beryllium-Free Alloy for High-Load Bushing and Bearing Applications" in Carpenter Product News, Mar. 19, 2010; https://www.cartech.com/news.aspx?id=3978, accessed Jan. 16, 2016.*

(Continued)

*Primary Examiner* — Tien Dinh
*Assistant Examiner* — Alexander V Giczy
(74) *Attorney, Agent, or Firm* — Snell & Wilmer L.L.P.

(57) ABSTRACT

The present disclosure includes landing gear components, such as an outer cylinder of a shock strut assembly. The outer cylinder includes one or more structural attachment pins configured to engage with other components of the landing gear including pintle frames, drag braces, and torque links. The pins include a cobalt alloy mated to a receptacle having a cobalt-containing coating on an inner surface, which eliminates the need for a bushing between the pin and the receptacle of the corresponding landing gear component.

14 Claims, 3 Drawing Sheets

(56) References Cited

U.S. PATENT DOCUMENTS

| | | | |
|---|---|---|---|
| 2009/0108131 A1* | 4/2009 | Lavigne | B64C 25/12 244/102 A |
| 2010/0304179 A1* | 12/2010 | Facchini | C25D 3/12 428/615 |
| 2010/0304182 A1* | 12/2010 | Facchini | B32B 15/013 428/652 |
| 2011/0285091 A1* | 11/2011 | Wodrich | B22D 19/08 277/377 |
| 2012/0095702 A1* | 4/2012 | Baird | B64C 25/00 702/42 |
| 2013/0071627 A1* | 3/2013 | Archer | B22F 3/15 428/174 |
| 2013/0156555 A1* | 6/2013 | Budinger | B23K 1/0018 415/182.1 |
| 2014/0060707 A1* | 3/2014 | Wright | C22F 1/10 148/538 |

OTHER PUBLICATIONS

Integran Technologies Inc. "Nanovate CoP—Corrosion and wear protection for steel", http://www.integran.com/services/corrosion---wear-resistant-coatings/, accessed Jan. 16, 2016. Archived by Internet Archive on Nov. 23, 2013, http://web.archive.org/web/20131123051510/http://www.integran.com/services/corrosion---wear-resistant-coatings.*

3T RPD Ltd., Material Specification Cobalt Chrome Alloy Co28Cr6Mo; http://www.3trpd.co.uk/wp-content/uploads/2013/03/cobalt-chrome-alloy-co28-cr6mo-2012.pdf, accessed on Jan. 13, 2016; archived by Internet Archive on Sep. 3, 2013, https://web.archive.org/web/*/http://www.3trpd.co.uk/wp-content/uploads/2013/03/cobalt-chrome-alloy-co28-cr6mo-2012.pdf.*

Keith O. Legg, "New Finishing Technologies Taking Off", Products Finishing, posted Mar. 1, 2008; http://www.pfonline.com/articles/new-finishing-technologies-taking-off, accessed Jan. 13, 2016.*

IMOA (International Molybdenum Association), Moly Review, Jul. 2009; http://www.imoa.info/download_files/molyreview/MolyReview_July_2009.pdf; accesssed Jun. 7, 2016.*

Eric Fodran et al. "New DERDP Project: Copper-Beryllium Alternatives Alloys Development", Project No. WP2138, Feb 10, 2011. Presented at ASETSDefense 2011: Sustainable Surface Engineeering for Aerospace and Defense Workshop, Feb 7-10, 2011, New Orleans, LA. http://www.asetsdefense.org/documents/Workshops/SustainableSurfaceEngineering2011/55-Fodran_Cu-Be%20Alternative%20Dev%20-%20ASETS%20Presentation%20R1.pdf, accessed Jul. 25, 2016. (Northrop Grumman Clearance Approval# 11-0061).*

Google.com, definition of bushing; https://www.google.com/search?q=define+bushing&sourceid=ie7&rls=com.microsoft:en-US:IE-Address&ie=&oe=&gws_rd=ssl, accessed Jul. 29, 2016.*

Extended European Search Report dated Jan. 26, 2016 in European Application No. 15186603.5.

Material Specification Cobalt Chrome Alloy C028Cr6Mo, Sep. 3, 2013, retrieved from http://www.3trpd.co.uk/wp-content/uploads/2013/03/cobalt-chrome-alloy-co28-cr6mo-2012.pdf on Jan. 15, 2016, 1 page.

* cited by examiner

LANDING GEAR COMPONENTS HAVING IMPROVED JOINTS

FIELD

The present disclosure relates generally to landing gear assemblies and, more specifically, to components of landing gear assemblies having attachment pins mated with thin plated wear coated components.

BACKGROUND

Landing gear assemblies typically comprise a shock strut assembly coupled to a wheel truck having one or more wheels. The shock strut assembly is also coupled to other components of the landing gear, including a pintle frame, one or more torque links, and one or more drag braces. Each of these components (as well as others) may be secured to the shock strut assembly by a joint that comprises a pin or structural attachment on the outer cylinder of the shock strut and a corresponding receptacle on the component. Typically, these pins are made from high tensile strength steel which is then coated with a hard wear resistant plating or coating. Such joints also comprise a bushing to reduce wear to the pin or structural attachment and the corresponding receptacle. The bushings typically include a greased or oiled interface due to their limited dry wear properties. Further, the bushings must be replaced at regular intervals.

SUMMARY

A landing gear system in accordance with the present disclosure may comprise a shock strut having an outer cylinder with at least one structural attachment portion, wherein at least one structural attachment portion comprises a cobalt substrate and a metal component having a complementary receptacle comprising a cobalt containing coating over at least a portion of the cobalt substrate and configured to be removably coupled to the structural attachment portion of the outer cylinder. The structural attachment portion may comprise one of a drag brace pin, a torque link pin, and a lower pintle frame pin. The metal component may comprise a pintle frame and the structural attachment portion comprises one of a lower pintle frame pin. The metal component may also comprise a drag brace and the structural attachment portion comprises a drag brace pin. The substrate of the structural attachment portion may comprise a cobalt-chromium-molybdenum alloy, such as Co-28Cr-6Mo. The cobalt containing coating may be electroplated on to the inner surface of the complementary receptacle.

A shock strut of a landing gear system in accordance with the present disclosure may comprise an outer cylinder, wherein the outer cylinder comprises at least one structural attachment portion, and wherein the at least one structural attachment portion comprises a cobalt substrate and is configured to engage with a complementary receptacle comprising cobalt containing coating. The structural attachment portion may couple the outer cylinder to a metal component of a landing gear system. The structural attachment portion may comprise one of a drag brace pin, a torque link pin, and a lower pintle frame pin. The metal component may comprise a torque link and the structural attachment portion comprises a torque link pin. The metal component may also comprise a pintle frame and the structural attachment portion comprises a lower pintle frame pin. Further, the metal component may comprise a drag brace and the structural attachment portion comprises a drag brace pin. The structural attachment portion may comprise Co-28Cr-6Mo.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Landing gear components (such as shock strut outer cylinders) of the present disclosure comprise improved pins and/or structural attachment portions. Specifically, pins comprising a cobalt alloy body and cobalt-containing coating may provide improved tensile strength, shear strength and/or wear characteristics. Further, the improved properties of these pins may allow for the elimination of separate, machined bushings typically found in various joints of landing gear systems, which tends to reduce weight. As bushings typically include a lubricant such as grease for lubrication, the elimination of bushings also eliminates the need to monitor and maintain proper lubrication of the bushing, as designs of the present disclosure are more lubricious than previous designs.

Figure 1:
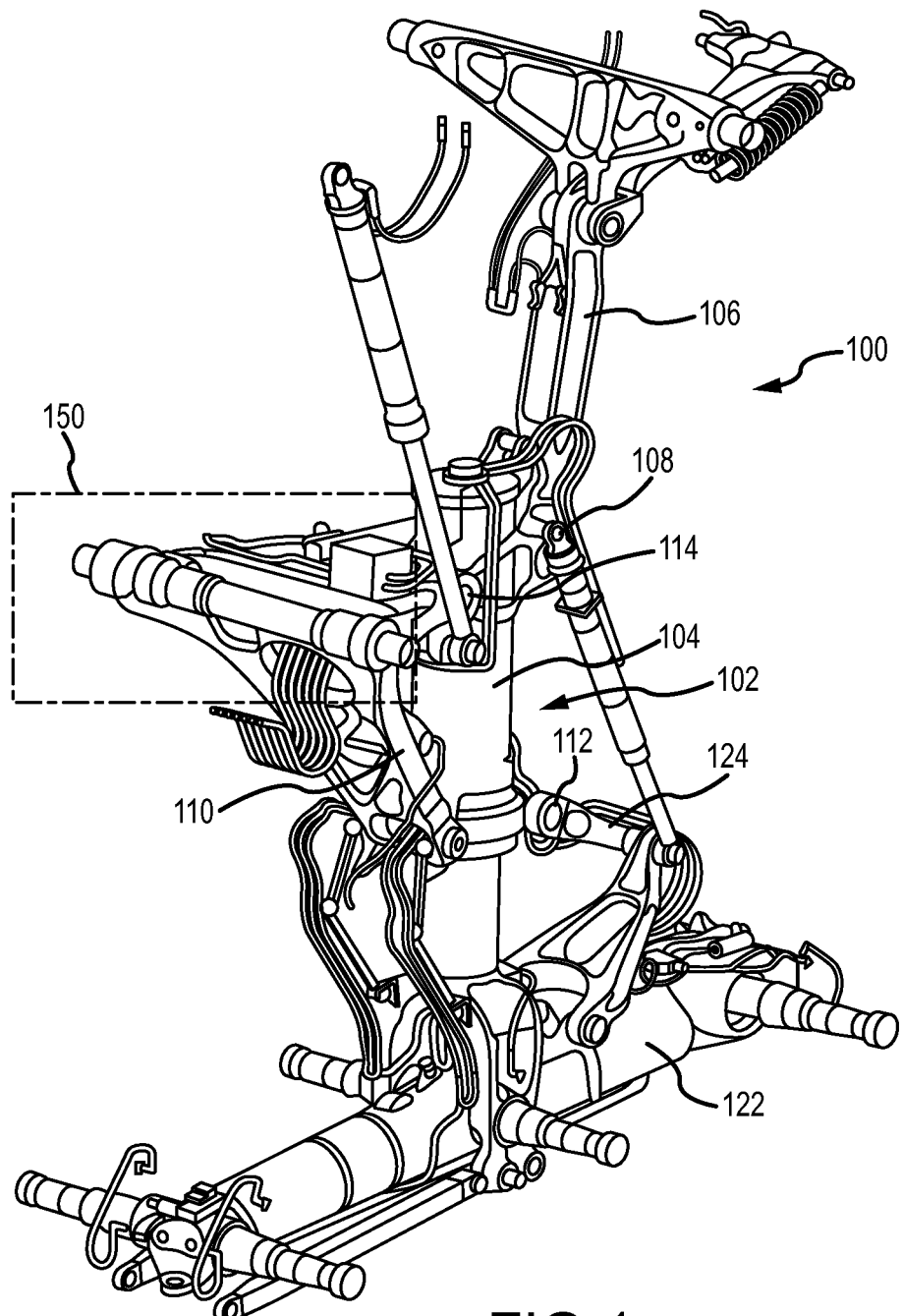
FIG. 1 illustrates a side view of a landing gear system in accordance with the present disclosure.

Accordingly, with reference to FIG. 1, a landing gear 100 is illustrated. Landing gear 100 may comprise, for example, a shock strut assembly 102. Shock strut assembly 102 may comprise an outer cylinder 104. In various embodiments, as will be discussed further, a number of components of landing gear 100 are removably coupled to outer cylinder 104. Outer cylinder 104 may comprise multiple structural attachment portions which are configured to engage with and couple one or more components of landing gear 100 to outer cylinder 104.

In various embodiments, outer cylinder 104 comprises a metal part body and one or more structural attachment portions. For example, outer cylinder 104 may comprise a number of structural attachment portions configured to engage with and removably couple various other components of landing gear 100 to outer cylinder 104. Such structural attachment portions may be referred to generally as "pins," and may differ in size, shape, and configuration from one another. As will be discussed further, each pin may be configured to couple to a corresponding receptacle of a particular metal component of landing gear 100.

Figure 2:
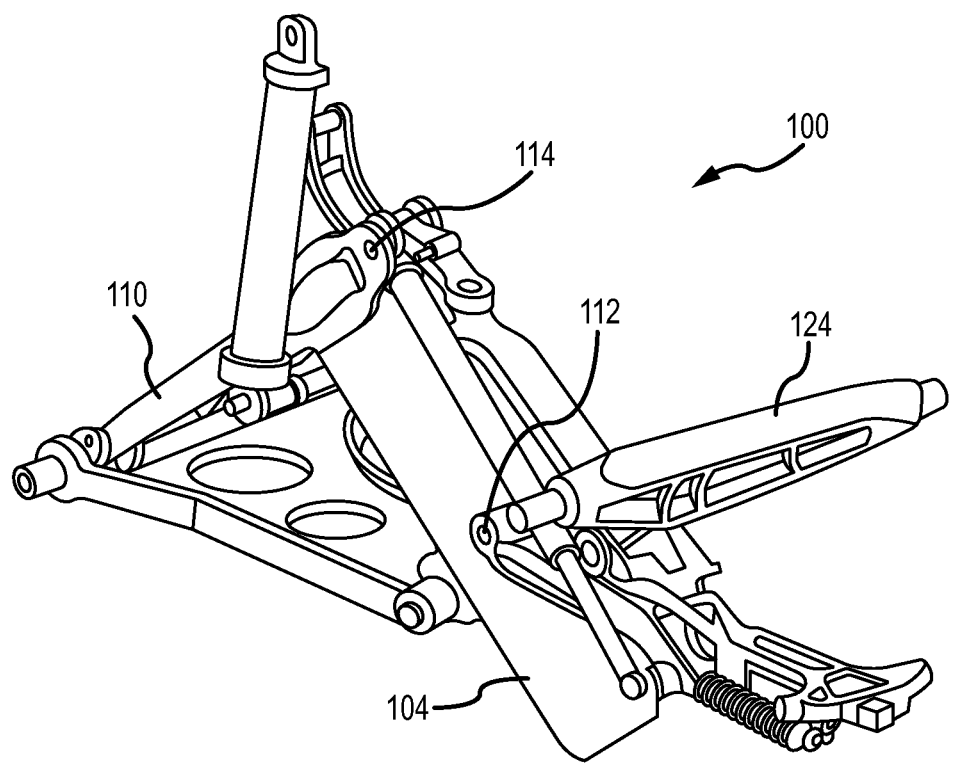
FIG. 2 illustrates a side view of a shock strut assembly in accordance with the present disclosure.
Figure 3:
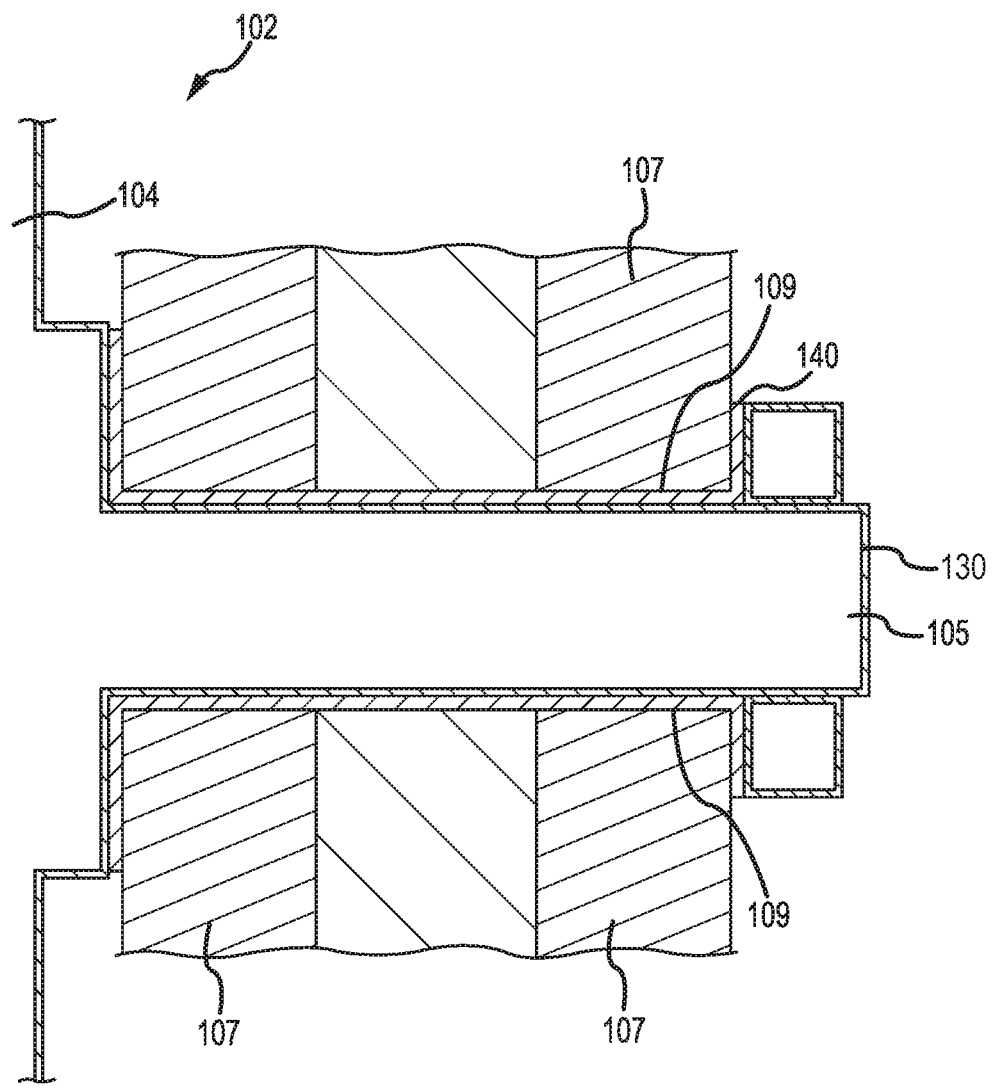
FIG. 3 illustrates a cross sectional view of a shock strut assembly in accordance with the present disclosure.

With reference to FIG. 2 and FIG. 3, outer cylinder 104 may comprise one or more pins 105. In various embodiments, pin 105 comprises a substrate 130. Substrate 130 may comprise, for example, a cobalt alloy. In that regard, substrate 130 may be referred to as a cobalt substrate. In various embodiments, cobalt substrate 130 comprises an alloy of cobalt with chromium and/or molybdenum, such as a cobalt-chromium-molybdenum alloy. For example, cobalt substrate 130 may comprise Co-28Cr-6Mo, also known as Acube® 100, produced by Carpenter. In various embodiments, cobalt substrate 130 comprises at least 15% cobalt by weight.

In various embodiments, substrate 130 provides improved strength and wear resistance. For example, pins comprising substrate 130 may be used on various parts that tend to experience fatigue over time, in place of conventional pins which comprise materials of decreased tensile strength, such as Al—Ni—Br and/or CuBe alloys. Further, pins comprising substrate 130 tend to improve corrosion resistance even in embodiments where a substrate 130 does not have a coating.

Pins 105 may, for example, be formed independently from outer cylinder 104, and then secured to outer cylinder 104. For example, pins 105 may be welded to an outer surface of outer cylinder 104. In other embodiments, pins 105 are integral to outer cylinder 104.

As will be discussed, pins 105 may comprise pins configured to engage with and removably couple various components of landing gear 100 to shock strut assembly 102. With reference to FIGS. 1 and 2, pins 105 may comprise, for example, any of a drag brace pin, a lower pintle frame pin, and a torque link pin, among other pins.

With reference to FIG. 3, pins 105 may be configured to engage with a complementary receptacle 107. For example, a complementary receptacle 107 may be configured to receive, maintain connection with, and orient an individual pin 105. In various embodiments, receptacle 107 comprises a portion of a component of landing gear 100 to which pin 105 engages to couple the component to shock strut assembly 102. In various embodiments, outer cylinder 104 comprises one or more pins that are complementary to receptacles and/or joints of multiple components of landing gear 100. The combination of a pin 105 of outer cylinder 104 and the corresponding receptacle 107 of each component may be referred to as a joint.

Receptacle 107 may comprise an inner surface 109 coated with a coating 140. In various embodiments, coating 140, for example, cobalt-containing coating applied to at least a portion of inner surface 109. For example, coating 140 may comprise a cobalt-containing coating. In various embodiments, coating 140 may comprise Nanovate ™ cobalt phosphorous coating produced by Integran. Cobalt-containing coating 140 may be electroplated onto inner surface 109. However, any method of depositing one or more layers of cobalt-containing coating 140 to inner surface 109 of corresponding receptacle 107 is within the scope of the present disclosure.

In various embodiments, coating 140 provides enhanced wear resistance to pins 105 of outer cylinder 104 so as to reduce or eliminate the desirability of a bushing. For example, typical joints between a drag brace and an outer cylinder include a bushing positioned around the drag brace pin. In various embodiments, coating 140 reduces or eliminates the desirability for such a bushing. Complementary receptacles 107 comprising coating 140 may be particularly useful in joints where expensive anti-wear coatings are used, as well as joints which are difficult to lubricate.

As will be discussed, receptacle 107 may comprise a portion of landing gear components including a drag brace 106, a pintle frame 110, and a torque link 124, among other components of landing gear 100.

With reference to FIG. 1, landing gear 100 may further comprise, for example, a drag brace 106. In various embodiments, drag brace 106 is removably coupled to outer cylinder 104. For example, outer cylinder 104 may comprise a drag brace pin 108 configured to engage with a corresponding receptacle and/or joint of drag brace 106.

In various embodiments, landing gear 100 may comprise a pintle frame 110. For example, frame 110 may removably couple shock strut assembly 102 to an airframe as represented by box 150. Outer cylinder 104 may comprise a lower pintle frame pin 114. In such embodiments, lower pintle frame pin 114 may engage with a complementary receptacle and/or joint of pintle frame 110.

In various embodiments, landing gear 100 further comprises one or more torque links 124. For example, torque link 124 may removably couple to shock strut assembly 102 and orient the assembly with relation to other components of landing gear 100, including, for example, a bogie beam 122. Outer cylinder 104 may comprise one or more torque link pins 112 capable of engaging with a corresponding receptacle and/or joint of torque link 124.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear system, comprising:
   a shock strut comprising an outer cylinder having a structural attachment portion comprising at least one of a drag brace pin, a torque link pin, or a lower pintle frame pin, the structural attachment portion comprising a cobalt substrate, wherein the cobalt substrate of the structural attachment portion comprises a cobalt-chromium-molybdenum alloy; and
   a metal component having a complementary receptacle comprising a cobalt-containing coating over at least a portion of an inner surface, and the complementary receptacle being configured to be removably coupled directly to the structural attachment portion of the outer cylinder, wherein neither the metal component nor the complementary receptacle comprise a bushing.

2. The landing gear system of claim 1, wherein the metal component comprises at least one of a drag brace, a pintle frame, or a torque link.

3. The landing gear system of claim 1, wherein the structural attachment portion comprises a lower pintle frame pin and wherein the metal component comprises a pintle frame configured to engage with the lower pintle frame pin.

4. The landing gear system of claim 1, wherein the structural attachment portion comprises a drag brace pin, wherein the metal component comprises a drag brace configured to engage with the drag brace pin.

5. The landing gear system of claim 1, wherein the cobalt-chromium-molybdenum alloy comprises Co-28Cr-6Mo.

6. The landing gear system of claim 1, wherein the cobalt-containing coating is an electroplated coating on the inner surface of the complementary receptacle.

7. A shock strut of a landing gear system, comprising:
   an outer cylinder having a structural attachment portion comprising a cobalt substrate, the cobalt substrate comprising a cobalt-chromium-molybdenum alloy, and the structural attachment portion being configured to directly engage with a complementary receptacle comprising a cobalt-containing coating over at least a portion of an inner surface, the complementary receptacle being integral to a metal component of the landing gear system, wherein neither the metal component nor the complementary receptacle comprise a bushing.

8. The shock strut of claim 7, wherein the metal component comprises at least one of a drag brace, a pintle frame, or a torque link.

9. The shock strut of claim 7 wherein the structural attachment portion comprises at least one of a drag brace pin, a torque link pin, or a lower pintle frame pin.

10. The shock strut of claim 8, wherein the structural attachment portion comprises a torque link pin wherein the metal component comprises a torque link configured to engage with the torque link pin.

11. The shock strut of claim 8, wherein the structural attachment portion comprises a lower pintle frame pin wherein the metal component comprises a pintle frame configured to engage with the lower pintle frame pin.

12. The shock strut of claim 8, wherein the structural attachment portion comprises a drag brace pin, wherein the metal component comprises a drag brace configured to engage with the drag brace pin.

13. The shock strut of claim 7, wherein the structural attachment portion comprises Co-28Cr-6Mo.

14. The shock strut of claim 7, wherein the cobalt-containing coating is an electroplated coating on the inner surface of the complementary receptacle.

* * * * *

UNITED STATES PATENT AND TRADEMARK OFFICE
CERTIFICATE OF CORRECTION

| | | |
|---|---|---|
| PATENT NO. | : 9,452,827 B2 | Page 1 of 1 |
| APPLICATION NO. | : 14/497662 | |
| DATED | : September 27, 2016 | |
| INVENTOR(S) | : Noel C. Haynes et al. | |

It is certified that error appears in the above-identified patent and that said Letters Patent is hereby corrected as shown below:

Specification
In column 3, line 51, after "example," please insert --a--.

Signed and Sealed this
Fifteenth Day of November, 2016

Michelle K. Lee
*Director of the United States Patent and Trademark Office*